Dec. 6, 1960 A. L. FORD 2,962,747
AIR SQUEEGEE
Filed Oct. 19, 1956 2 Sheets-Sheet 1

INVENTOR.
ARTHUR L. FORD
BY
ATTORNEY

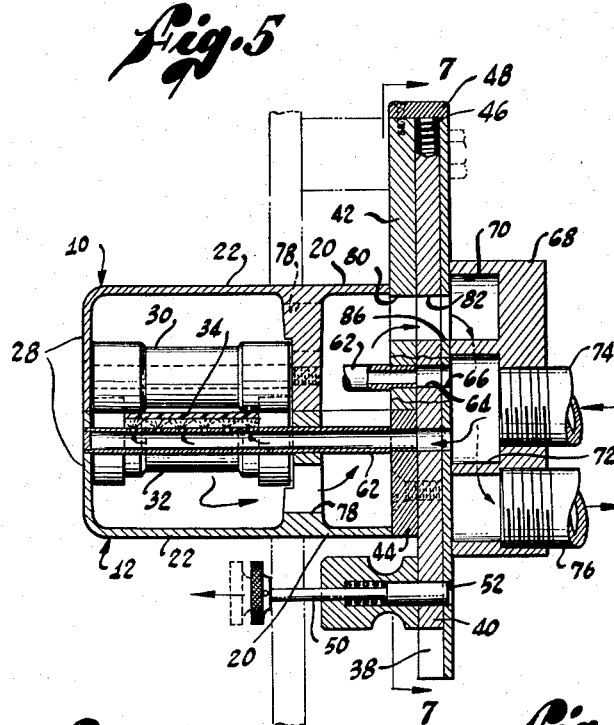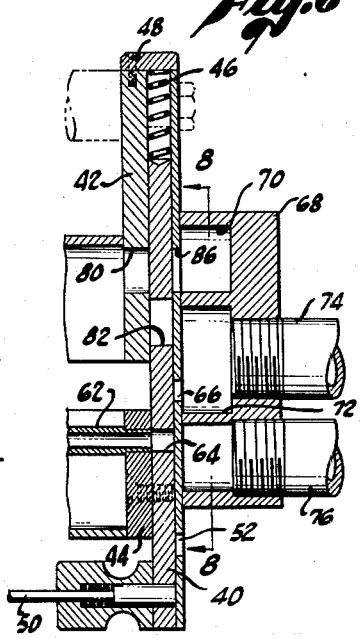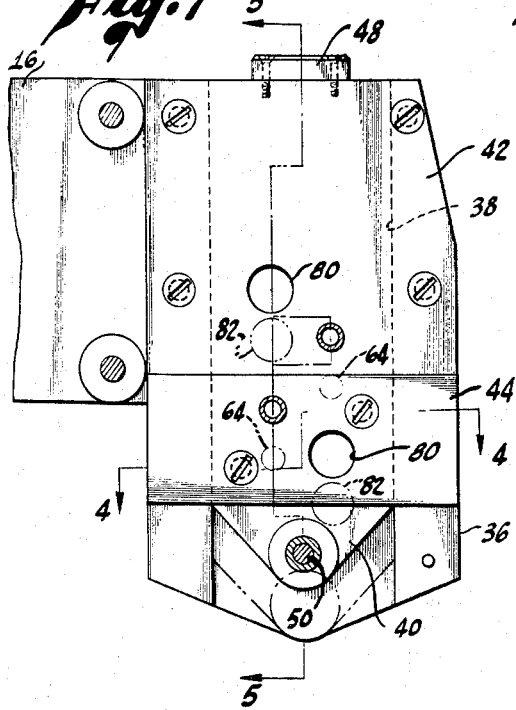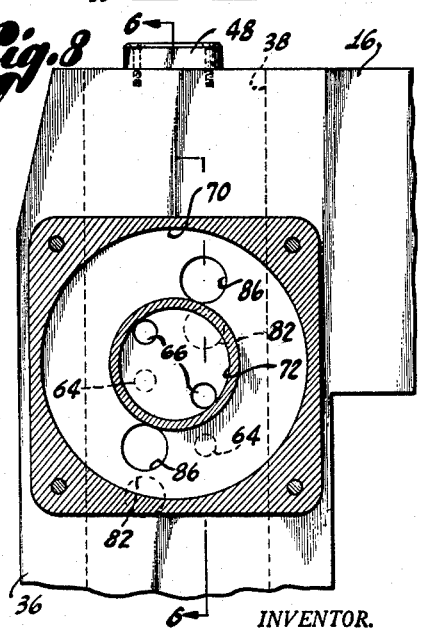
INVENTOR.
ARTHUR L. FORD
ATTORNEY

United States Patent Office 2,962,747
Patented Dec. 6, 1960

2,962,747

AIR SQUEEGEE

Arthur L. Ford, Granada Hills, Calif., assignor to Unicorn Engineering Corporation, Los Angeles, Calif., a corporation of California Filed Oct. 19, 1956, Ser. No. 617,022

6 Claims. (Cl. 15—306)

This invention relates to apparatus for handling motion picture film and particularly to a new and improved air squeegee for removing dust, lint, and other foreign matter from the surface of film.

In motion picture film printing machines and certain other film handling machines, it is highly essential that the film being handled be completely free of dust, lint, and other foreign matter. In printing motion picture film, for instance, even small accumulations of dust on the developed film produce a print of low quality. The removal of such foreign matter from film is especially essential in film processing laboratories not equipped with modern, filtered air conditioning systems, since the air in such laboratories contains a substantial percentage of suspended dust and the like which settles on the film.

Motion picture film and, especially, the original negative film represent a substantial investment. Extreme care must, therefore, be exercised in removing foreign matter from the film so as to avoid scratching, marring, or otherwise impairing its quality. So-called air squeegees are commonly employed for this purpose.

One form of existing air squeegee consists essentially of a pair of hollow casings between which the film moves and which have open sides facing the film. Mounted within each of these casings, at opposite sides of the film, are air tubes formed with a series of orifices through which jets of air are directed onto the film for blowing dust, lint, and other foreign matter therefrom. The interior of the chambers are continuously evacuated to draw away the particles of foreign matter.

Motion picture film is subject to transverse bowing with changes in humidity, and, in the past, difficulty was experienced due to rubbing of the film against the squeegee casings during excessive bowing of the film. Thus, in the existing squeegee the casings were spaced just sufficiently to allow free movement of the film therebetween and had their inner edges relieved opposite the central portion of the film to accommodate a degree of bowing of the latter. Often, however, the bow exceeded that for which the squeegee was designed and, in such cases, the film would rub against the casings causing scratching and marring of the film.

Further, the film was not guided through the squeegee, and many times vibration of the film would result in rubbing of the latter against the casings. Also, while the jets of air directed against opposite sides of the film were alined and designed to produce equal and opposite forces on the film, so as to not deflect the latter into contact with one or another of the casings, any slight variation in the jets at one side of the film would result in unequal forces on the film with resultant deflection of the latter against one of the casings. Moreover, this requirement that the jets counteract one another introduced substantial complications in the design and adjustment of the squeegee.

A general object of this invention is the provision of an air squeegee which avoids the above and other deficiencies of existing air squeegees.

A more specific object of the invention is the provision of an air squeegee wherein the film passing through the squeegee is supported on freely rotatable surfaces which turn with the film so as to eliminate entirely sliding contact between the squeegee and the surfaces of the film which would mar the latter.

Another object of the invention is the provision of an air squeegee of the class described embodying flanged entrance and exit film guide rollers which prevent rubbing of the edges of the film against stationary surfaces.

Another object of the invention is the provision of an air squeegee of the class described embodying freely rotatable film supporting rollers arranged to provide an arcuate run of film in the squeegee and thereby eliminate bowing of the film and provide sufficient wraparound of the film on the rollers to assure rotation of the latter with the film.

Yet another object of the invention is the provision of an air squeegee of the class described wherein the air tubes for directing jets of air against the film are alined with the supporting rollers so as to eliminate the possibility of deflection of the film into rubbing contact with stationary parts of the squeegee.

A further object of the invention is the provision of an air squeegee of the class described wherein the film is flexed during passage through the squeegee so as to promote loosening of particles of foreign matter from the film and establish centrifugal forces on the particles which tend to dislodge them from the film.

A still further object of the invention is the provision of an air squeegee of the class described wherein the jets of air are directed against convex surfaces of the film so that there is a tendency for the air to flow along the surface of the film and raise particles of foreign matter therefrom.

A further object of the invention is the provision of an air squeegee of the class described consisting of a pair of casings through which the film moves, which casings are relatively movable toward and away from one another to accommodate threading of film through the squeegee.

Another object of the invention is the provision of an air squeegee of the class described which is relatively simple in construction, inexpensive to manufacture, and otherwise especially well suited for its intended function.

Other objects, advantages, and features of the invention will become apparent as the description proceeds.

Briefly, the above objects are achieved in the illustrative embodiment of the invention by the provision of a pair of spaced, hollow casings having facing open sides between which the film passes. Each casing has within it an air tube formed with orifices opening toward the film and through which jets of air are directed onto opposite sides of the film. Mounted in each of the casings at opposite sides of the air tube are film supporting rollers. The air tubes and rollers in one casing are offset longitudinally of the film from the air tube and supporting rollers of the other casing so that one roller in each of the casings is located opposite the air tube in the other casing. The arrangement is such that the portion of the film against which the jets of air impinge are supported on the rollers. Deflection of the film into sliding contact with the casings is thereby avoided.

The rollers are offset in planes normal to the film so that the latter is caused to follow a generally S-shaped path through the squeegee which eliminates transverse bowing of the film into rubbing contact with the squeegee and provides sufficient wraparound of the film on the rollers to assure rotation of the latter with the film. Rubbing of the surfaces of the film against stationary surfaces is thereby avoided. Also, entrance and exit ones of these rollers are flanged and act as guides for film entering and leaving the squeegee so that rubbing of the edges of the film against stationary surfaces is avoided.

The portions of the film opposite the air tubes are convex on the side thereof adjacent the air tubes so that the air impinges on convex surfaces of film and tends to flow along the film surfaces to more readily dislodge foreign matter therefrom. Also, in high speed machines, the centrifugal forces on the particles of foreign matter on these convex portions of the film become appreciable and are thought to be sufficient to cause loosening and dislodging of particles. Finally, flexing of the film during passage through the squeegee tends to loosen hard particles which adhere to the film so as to facilitate their removal by the jets of air. The interiors of the casings communicate with a vacuum device which draws the loosened particles from the interior of the casings.

In certain types of film handling machines, such as developing machines wherein such a squeegee may be employed, threading of film through the squeegee is generally performed at leader portions. Marring of these portions, obviously, need not be avoided. In such installations, the two squeegee casings may be rigidly attached to a suitable supporting structure.

In other film handling machines, such as film printing machines, however, it is frequently necessary to thread picture portions of the film through the squeegee. For use in such installations the invention proposes mounting of the squeegee casings on the support for movement toward and away from one another to enable positioning of the film in the squeegee without marring of the latter.

A better understanding of the invention may be had from the following detailed description thereof taken in connection with the annexed drawings:

Figure 5 is a section taken along line 5—5 of Figure 7 showing the squeegee casings in closed operative position;

Figure 6 is a section taken along line 6—6 of Figure 8 showing the squeegee casings in open position to accommodate insertion of film in the squeegee;

Figure 7 is a section taken along line 7—7 of Figure 5; and

Figure 8 is a section taken along line 8—8 of Figure 6.

Figure 1:
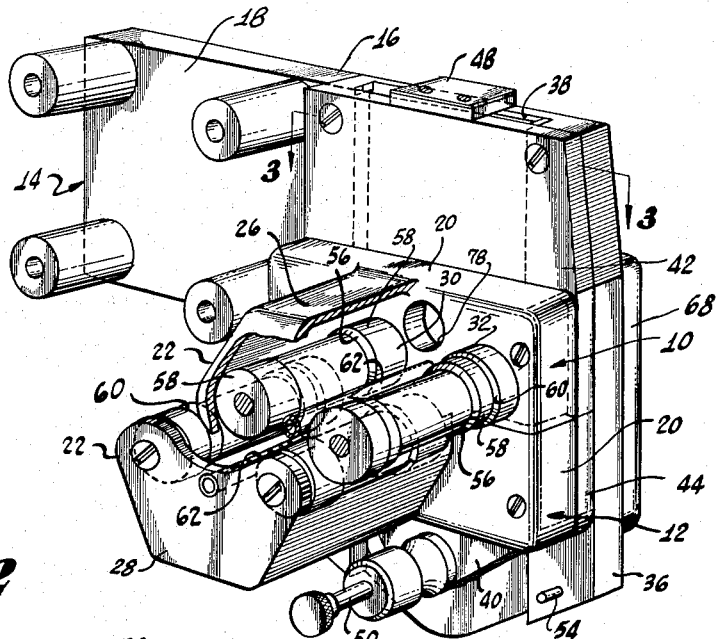
Figure 1 is a view in perspective of the present air squeegee.

The illustrative embodiment of the present air squeegee comprises a pair of hollow squeegee casings 10 and 12 and a supporting frame 14 therefor. Frame 14 includes a rear plate 16 of generally L-shaped configuration. One leg 18 of the plate extends laterally and provides a mounting bracket for attachment of the squeegee to the frame of a film handling machine, such as a film printer.

Squeegee casings 10 and 12 are identical, so as to be interchangeable for simplicity of manufacture and assembly. Each casing comprises a hollow base 20 from which extends a hollow hood 22. Hoods 22 have inclined side walls 24 bridged by top walls 26 and forward end walls 28. The facing sides of the hoods, opposite the walls 26, are open.

Figures 2, 3, 4:
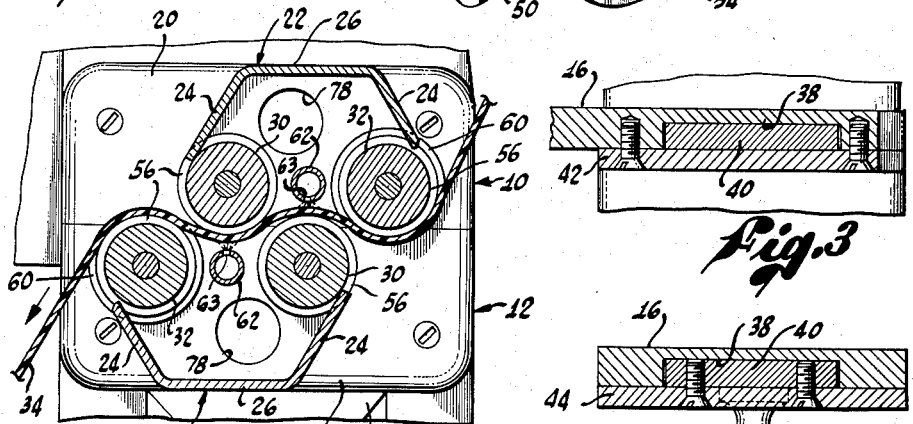
Figure 2 is a front elevation, partially in section, of a portion of the squeegee of Figure 1.
Figure 3 is an enlarged section taken substantially along line 3—3 of Figure 1.
Figure 4 is an enlarged section taken along line 4—4 of Figure 7.

Rotatably mounted on each hood 22, between the mounting base 20 and the forward end walls 28, are a pair of film rollers 30 and 32. As shown in Figure 2, and as will be presently more fully described, film 34 to be cleaned moves between the rollers of the upper and lower casings 10 and 12.

In order to facilitate threading of the film between the rollers, the lower squeegee casing 12 is vertically movable from an upper closed position, shown in Figures 1, 2, and 5, to a lower open position shown in Figure 6. In this open position, the spacing between the casings 10 and 12 is sufficient to permit easy axial positioning of the film between the rollers therein. Marring of the film is thus avoided.

To accomplish this vertical movement of the lower casing, the right hand leg 36 of the L-shaped frame plate 16 is formed with a vertical guideway 38 opening through the front face of the plate. Movable in this guideway is a slide 40. A retaining plate 42, overlying the upper portion of the guideway 38 and fixed to the frame plate 16, retains slide 40 in the guideway. Upper squeegee casing 10 is secured to this retaining plate flush with the lower edge of the plate.

The lower, movable squeegee casing 12 is secured to a spacer plate 44 having the same thickness as retaining plate 42. Spacer plate 44, in turn, is secured to slide 40 as shown in Figure 4. In the upper, closed position of the lower casing 12, the upper edge of its base 20 and that of spacer plate 44 abut, respectively, the lower edge of the base 20 of the stationary upper casing 10 and retaining plate 42.

Slide 40 is biased downwardly by a compression spring 46, Figures 5 and 6, acting between the upper end of the slide 40 and a plate 48 fixed to the upper edge of the retaining plate and overlying the upper end of the guideway 38. A spring pressed pin 50 on the lower end of the slide 40 is engageable in a hole 52 in the bottom of guideway 38, when the slide is in its upper position of Figure 5, for releasably retaining the lower squeegee casing in its upper, closed position against the action of spring 46. Downward movement of the slide 40 to position the lower squeegee casing 12 in its open position, under the action of the spring 46 when pin 50 is retracted, is limited by a stop pin 54 on the frame plate 16.

As previously indicated, film 34 moves between the pairs of rollers 30 and 32 in the two squeegee casings as shown in Figure 2. To prevent marring of the film by the rollers, the latter are centrally formed with peripheral grooves 56. These grooves have a width slightly less than the width of film 34 so that only opposite side edges of the latter contact the rollers, the film bearing on the enlarged portions 58 of the rollers at opposite sides of the grooves 56. Roller 32 in each squeegee casing is further enlarged, or flanged, at its ends to form annular guide shoulders 60 for the film. These flanged rollers act as guides for film entering and leaving the squeegee so as to avoid rubbing of the film edges against stationary surfaces without the use of external guide rollers.

Figure 2A:
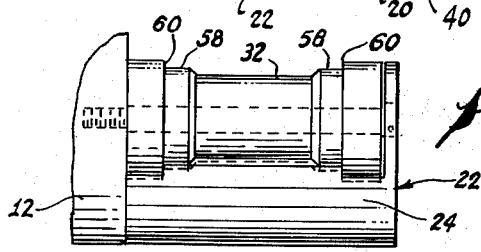
Figure 2a is a detail view illustrating the manner in which the side walls of the squeegee casing are stepped to match the stepped configuration of the squeegee guide rollers.

Rollers 30 and 32 are so located in the hoods 22 of their respective casings that the free edges of the inclined walls 24 of the hoods 22 are substantially tangent to their adjacent rollers 30 and 32, as shown most clearly in Figure 2. These free edges of the inclined side walls 24 are relieved, as may be seen most clearly in Figure 2a, to accommodate the stepped configuration of the rollers. As will be seen, jets of air are impinged on the film within the hoods 22, and particles blown from the film are exhausted from the shells. The above-described close positioning of the rollers 30 and 32 and their adjacent hood walls 24 aid in providing a relatively air tight construction to the squeegee casings.

As illustrated most clearly in Figure 2, the hoods 22 of the squeegee casings 10 and 12 are offset toward one end of their respective mounting bases 20. Accordingly, when the casings are mounted in position on the frame 14, the hoods 22 of the upper and lower casings are laterally offset relative to one another. Also, the film rollers 30 and 32 of the two casings have their peripheries projecting somewhat beyond the abutting edges of their mounting bases 20 and are offset relative to the rollers in the opposite casing. The arrangement is such that when the lower casing 12 is moved to its upper closed position, shown in Figure 2, film 34 is formed into a generally double-S configuration. This arcuate configuration of the film, during its movement through the squeegee assemblies, prevents lateral bowing of the film 34. The central picture portions of the film are thereby maintained out of contact with the film rollers 30 and 32 and marring of the film is avoided. Also, sufficient wraparound of the film on the rollers is provided to assure frictional driving of the latter by the film. Sliding contact between the film and the rollers, as well as other stationary surfaces of the squeegee, is thus avoided.

Indicated at 62 are a pair of air pipes within the squeegee casings. These pipes extend in parallel relationship with the rollers 30 and 32 and are arranged opposite and slightly spaced from the film roller 30 in the opposite casing. Each of these air pipes is provided with a series of small openings 63 opening toward the rollers 30. During operation of the squeegee, as will be presently described, air is delivered to the air pipes 62 and is exhausted through the openings 64 onto the opposite surfaces of film 34 for blowing dust and other foreign matter therefrom. As just described, and as shown in Figure 2, the portions of the film 34 onto which the air is directed from the pipes 62 are backed up by the rollers 30 so that there is no tendency for the film to be deflected under the force of the air into contact with the squeegee casings. This is desirable to prevent scratching of the film.

Air pipe 62 in the upper casing 10 has its rear end tightly fitted in a hole in retaining plate 42, as shown most clearly in Figure 5, while air pipe 62 in the lower casing 12 has its rear end tightly fitted in a hole in the spacer plate 44 (Figure 6). In the upper position of the slide 40, holes 64 in the latter, register with the air pipes 62 in the upper and lower casings 10 and 12 and with openings 66 in the bottom of the guideway 38.

Fixed to the rear side of frame plate 16, immediately behind the squeegee casings, is an air supply and exhaust manifold 68 formed with an outer annular recess 70 and an inner, coaxial recess 72 opening through the forward face of the manifold. An air inlet conduit 74, adapted for connection to a source of air under pressure, not shown, communicates with the central recess 72 while an exhaust pipe 76, adapted for connection to a vacuum source, not known, communicates with the outer annular recess 70. The arrangement is such that in the upper position of the slide 40, air entering the manifold 68 through the pipe 74 flows through the now alined openings 66, in the bottom wall of guideway 38, 64 in slide 40, into the air pipes 62. As just mentioned, air is directed from the pipes onto the film for blowing dust and other foreign matter therefrom.

To provide for exhausting of this foreign matter from the squeegee casings 10 and 12, the forward walls of the mounting bases 20 of the squeegee assemblies are provided with exhaust openings 78 opening into the respective hoods 22 of the casings and to the interiors of the hollow mounting bases 20 thereof. Retaining plate 42 and spacer plate 44 are formed with exhaust openings 80 (only one shown in Figure 5, see Figure 7) opening into the interiors of the mounting bases 20. In the upper position of the slide 40, these latter openings register with openings 82 (only one shown in Figure 5, see Figure 7) and openings 86 in the bottom wall of the guideway 38. These latter openings communicate with the annular recess 70 in the manifold 68. The arrangement is such that particles of foreign matter blown from the film 34 are exhausted from the interiors of the shells 22 through the exhaust openings 78, 80, 82, and 86 into the annular recess 70 of the manifold 68 and thence through the exhaust pipe 76 to a collector, not shown.

When the slide 40 is lowered to move the lower squeegee casing 12 to its open position, the air inlet openings 64 and exhaust openings 82 in the slide are moved out of alinement with their associated openings in the bottom of the guideway 38 so that both the flow of air into the casings and exhausting of air from the casings are cut off.

The operation of the present air squeegee is believed to be obvious from the foregoing description. Thus, when the film 34 is to be positioned in the squeegee, the lower casing 12 is moved to its lower open position, Figure 6, wherein, as previously mentioned, the rollers 30 and 32 in the two casings are sufficiently separated to permit easy axial positioning of the film between the rollers without scratching of the film.

As just mentioned, this lowering of the slide 40 cuts off the supply of air to and exhausting of air from the casings. After the film is properly positioned, the slide 40 is raised to move the lower casing 12 to its upper closed position, Figure 5, wherein the film 34 is caused to conform to a substantially double-S-shaped configuration which, as mentioned, prevents lateral bowing of the film into contact with the rollers. Also, sufficient wraparound of the film on the rollers is thereby provided to assure rotation of the rollers with the film. Sliding of the film on the rollers is thus avoided. In this upper closed position of the slide, the openings in the slide become alined with their respective openings in the other parts of the squeegee assembly so that communication is automatically established between the interiors of the hoods 22 and the source of pressurized air and vacuum producing means. Air is thereby directed onto the opposite surfaces of film through the openings 64 in the air pipes 62 to blow foreign matter from the surfaces of the film. These particles of foreign matter are exhausted through the vacuum pipe 76 to a filter or the like for collecting such particles.

Since the air is impinged on convex portions of the film, there is a tendency for the air to flow along the film surfaces and lift particles from the film. Also it is thought that flexing of the film during passage of the latter through the squeegee tends to loosen the particles so that they may be more easily dislodged by the jets of air. It is also thought that in high speed operations the centrifugal forces exerted on the particles at the convex portions of the film may aid in removal of the particles.

The air squeegee illustrated is primarily intended for use on a motion picture film printing machine and will be located to receive the film just prior to passage of the latter through the printing beam. In use of such film printing machines, as is well known, it is often necessary to remove and insert picture portions of film into and from the squeegee. In such cases it is highly essential that the squeegee casings 10 and 12 be separable, as in the illustrative embodiment, to prevent marring and scratching of the film during positioning of the latter in the squeegee.

In some cases, however, the present air squeegee may be mounted on other types of film handling machines wherein the occasion only arises to insert blank leader portions of the film in the squeegee. In such cases, obviously, it is not necessary to avoid scratching of these leader portions. Accordingly, for use in such film handling machines, both the upper and lower squeegee casings 10 and 12 might be rigidly mounted on the supporting frame 14, since there is then no necessity for separation of the casings.

Numerous other modifications in design and arrangement of parts will be readily apparent to those skilled in the art within the scope of the following claims.

I claim:

1. An air squeegee comprising a pair of casings including hollow hoods having facing open sides between which a strip to be cleaned is adapted to move, guide rollers on the hoods between which the strip is adapted to be positioned, a support stationarily mounting one of said casings, a slide on the support mounting the other casing for movement toward and away from the one casing to facilitate positioning of a strip between said rollers, an air tube in each hood having discharge openings through which jets of air may be directed onto opposite sides of the strip, there being first passages for communication of said air tubes to a source of pressurized air, and second passages opening to the interiors of said hoods for communication to a vacuum to draw off foreign matter loosened from the strip, said passages each including openings in the slide and support which are alined when the casings are moved together and misalined when the casings are separated whereby the supply of air to said air aubes and evacuation of the interiors of said hoods are automatically cut off when the casings are separated and re-established when the casings are moved together.

2. An air squeegee comprising a frame, a pair of hollow hoods mounted on said frame and having facing open sides between which a strip to be cleaned is adapted to move, a pair of spaced, parallel guide rollers disposed in the open side of each hood and rotatably mounted between two opposite side walls of the respective hood with their peripheries closely adjacent to other side walls of the respective hood so as to minimize leakage of air between the rollers and side walls, said pairs of rollers being parallel and engageable with opposite sides of a strip to be cleaned, said hoods being offset in a direction normal to the roller axes so that one roller of each pair of rollers is disposed between the other pair of rollers and the strip engaging peripheral portion of said one roller of each pair being offset toward the opposite hood relative to a plane tangent to the strip engaging peripheral portions of the other pair of rollers for holding a strip against the other pair of rollers, a nozzle in each hood between the adjacent pair of rollers for directing a jet of air toward said one roller of the other pair of rollers, the frame and one side wall of each hood having communicating exhaust passages through which the hoods may be evacuated.

3. An air squeegee comprising a pair of casings including hollow hoods having facing open sides between which a strip to be cleaned is adapted to move, guide rollers on the hoods between which the strip is adapted to be positioned, a frame stationarily mounting one of said casings, a slide on the frame mounting the other casing for movement toward and away from the one casing to facilitate positioning of a strip between said rollers, an air tube in each hood having discharge openings through which jets of air may be directed onto opposite sides of the strip, there being first passages for communicating said air tubes to a source of pressurized air and second passages opening to the interiors of said hoods for communication to a vacuum source, said passages each including openings in the slide and frame which are aligned when the casings are moved together and misaligned when the casings are separated whereby the supply of air to said air tubes and evacuation of the hoods are automatically cut off when the casings are separated and reestablished when the casings are moved together, and a manifold on said frame having first and second chambers communicating respectively to said frame openings of said first and second passages, said manifold including an air inlet opening to said first chamber and an air exhaust opening to said second chamber.

4. An air squeegee comprising a frame, a pair of hollow hoods mounted on said frame and having facing open sides between which a strip to be cleaned is adapted to move, a pair of spaced, parallel guide rollers rotatably mounted between two opposite side walls of each hood with their peripheries closely adjacent to other side walls of the respective hood so as to minimize leakage of air between the rollers and side walls, said pairs of rollers being engageable with opposite sides of a strip to be cleaned, said hoods being offset so that one roller of each pair of rollers is disposed between the other pair of rollers, a nozzle in each hood between the adjacent pair of rollers for directing a jet of air toward said one roller of the other pair of rollers, one side wall of each hood having an exhaust passage through which the hood may be evacuated.

5. An air squeegee comprising a frame, a casing on said frame including a hollow hood having a rectangular open side bounded along two opposite edges by approximately parallel edge portions of two opposite walls of said hood and its remaining sides by opposite parallel walls of said hood which extend beyond the plane of said edge portions, a pair of parallel guide rollers in said open side rotatably mounted between said parallel walls and located closely adjacent and approximately parallel to said edge portions, said rollers having stepped configurations providing on each roller a pair of axially spaced, circumferential guide shoulders and a circumferential recessed portion between said shoulders, said edge portions being stepped to conform with and complement the stepped configuration of the rollers whereby to minimize the air leakage space between the rollers and edge portions, an additional guide roller rotatably mounted on said frame between and parallel to said pair of guide rollers, an air tube in said hood for directing jets of air toward said additional roller, and an exhaust passage on said frame opening to the interior of said hood.

6. An air squeegee comprising a frame, a pair of casings on said frame each including a hollow base and a hollow hood projecting from the base, the interior of each base and the interior of the adjacent hood being separated by a wall and communicating through an opening in the wall, said hoods having facing open sides between which a strip to be cleaned is adapted to move, guide rollers on said hoods between which the strip is adapted to be positioned, one of said casings being stationarily mounted on the frame, means mounting the other casing on the frame for movement toward said one casing to a normal operative position and away from said one casing to facilitate positioning of a strip between said rollers, means including air tubes in said hoods for directing jets of air against opposite sides of the strip, said bases having facing open sides bounded by edge surfaces of the walls of the bases which abut one another when said other casing is in said normal position whereby to form the interiors of the bases into a single chamber, and said frame having an exhaust passage opening to said chamber through which said hoods may be evacuated.

References Cited in the file of this patent

UNITED STATES PATENTS

| 1,407,543 | Hubbard | Feb. 21, 1922 |
| 1,623,528 | De Moos | Apr. 5, 1927 |
| 2,082,411 | Merrill | June 1, 1937 |
| 2,289,753 | Capstaff | July 14, 1942 |
| 2,499,572 | Dunakin | Mar. 7, 1950 |
| 2,623,225 | Frankel | Dec. 30, 1952 |
| 2,648,089 | Mayer | Aug. 11, 1953 |
| 2,777,213 | Dungler | Jan. 15, 1957 |
| 2,818,595 | Rosewall | Jan. 7, 1958 |

FOREIGN PATENTS

| 7,662 | Great Britain | 1886 |
| 435,708 | Italy | May 21, 1948 |